United States Patent

Beaudry et al.

[15] 3,648,059
[45] Mar. 7, 1972

[54] POLARITY CONTROL ELECTRIC POWER SUPPLY CIRCUIT

[72] Inventors: Harvey James Beaudry, Fremont; Robert M. Waidtlow, Oakland, both of Calif.

[73] Assignee: International Plasma Corporation

[22] Filed: June 3, 1970

[21] Appl. No.: 43,136

[52] U.S. Cl. ............................................. 307/127, 321/15
[51] Int. Cl. ............................................................. H02j 1/00
[58] Field of Search ..................... 307/127, 262; 317/7, 8; 321/15

[56] References Cited

UNITED STATES PATENTS 3,413,487  11/1968  Gershen ............................. 307/127
3,535,593  10/1970  Schweitzer, Jr. .................... 317/39
2,967,989  1/1961   Eno et al. ............................ 321/2
3,313,960  4/1967   Borys .................................. 307/127
3,412,311  11/1968  Siedband ............................. 321/15

Primary Examiner—R. F. Staubly
Assistant Examiner—Gale R. Peterson
Attorney—Warren, Rubin, Brucker & Chickering

[57] ABSTRACT

A transformerless direct-coupled power supply circuit having built-in protection against faulty potential and ground side connections to the power supply mains and including a protective normally open relay which is closed to supply power only when proper potential and ground connections are made to the power supply mains.

4 Claims, 1 Drawing Figure

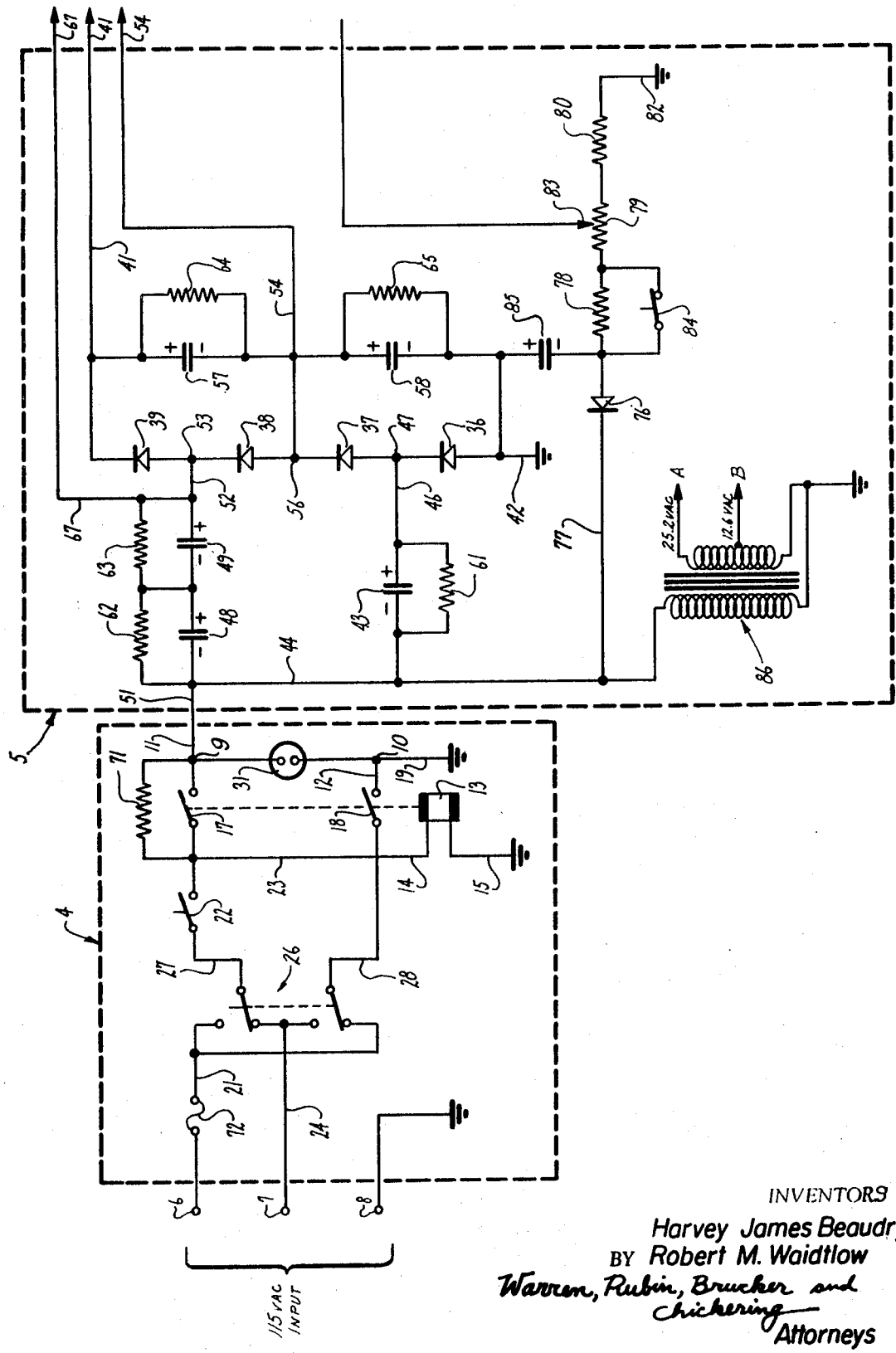

POLARITY CONTROL ELECTRIC POWER SUPPLY CIRCUIT

The invention relates to electric power supply circuits for applying AC power from the power supply mains to electrical apparatus having potential and ground power input terminals; and more particularly to transformerless direct coupled DC power supply circuits.

Relatively high-power industrial-type DC supply units used in 100 percent duty cycle operation have invariably required the use of a massive power transformer in order to provide needed power, a plurality of voltage outlet taps, a quality filtered DC output, satisfactory voltage regulation, and voltage isolation with attendant safety to personnel and equipment. Transformerless, direct-coupled DC power supply units are known, but in so far as applicants are aware, have never been used in relatively high-power industrial applications. In such units it is common to ground the chassis of the power supply and an inadvertent reversal in polarity of the applied voltage will produce extreme shock hazard to personnel and possible short circuit burn out of the equipment. Also where DC output voltages substantially higher than the AC supply voltage are required, voltage multiplication circuits as heretofore used are completely inadequate in supplying the necessary power, voltage regulation and multiplicity and filtered quality of output voltages.

An object of the present invention is to provide an electric power supply circuit of the character described which will have a built-in and foolproof control over the polarity of the applied supply voltage so that absolute safety to personnel and equipment may be assured.

Another object of the present invention is to provide a transformerless direct-coupled DC power supply of the character described which will eliminate the increase in size, weight, cost, heat, and mechanical vibration occasioned by the use of the usual power transformer, and which will provide high-power output adapted for 100 percent duty industrial use, a plurality of high-quality filtered DC outputs of varying voltages, and excellent voltage regulation.

The elimination of the power transformer with its attendant size, mass, heat, and mechanical vibration facilitates and enables the efficient assembly of the present power supply on a circuit board in a more compact unit of much less weight and cost than equivalent power supplies heretofore available.

The invention possesses other objects and features of advantage, some of which with the foregoing will be set forth in the following description of the preferred form of the invention which is illustrated in the drawing accompanying and forming a part of this specification. It is to be understood, however, that variations in the showing made by the said drawings and description may be adopted within the scope of the invention.

Referring to said drawing, the figure is a schematic wiring diagram of a polarity control transformerless direct-coupled DC power supply circuit constructed in accordance with the present invention.

The apparatus depicted in the accompanying drawing consists essentially of two sections, a polarity control section 4 and a DC rectifying, filtering, and voltage multiplication section 5. The polarity control section 4 consists briefly of a pair of power input terminals 6 and 7 adapted for connection to the potential and neutral, usually ground, sides of an electric power supply; a ground terminal 8; a pair of output terminals 9 and 10 providing power input for the associated apparatus 5; a relay winding or coil 13, having its ends 14 and 15 connected to terminals 6 and 8 respectively; and a pair of normally open relay switches 17 and 18 closed by coil 13 when energized, switch 17 being connected between coil end 14 and output terminal 9, and switch 18 being connected between terminal 7 and output terminal 10. Terminal 10 is connected to chassis ground by lead 19 and represents neutral or the grounded side of the output potential.

The apparatus is designed for use with the conventional three-pronged 120 volt AC outlet in which a pair of prongs are designed to carry the power and the third prong is connected to a ground lead having a physical connection to earth. Normally inlet terminal 6 will be connected to the "hot" or potential side of the incoming power and terminal 7 is connected to the neutral and normally grounded side of the incoming power. Under such circumstances power will flow from terminal 6 through conductor 21 to a manually controlled "power-on" switch 22 which when closed will feed power to conductor 23 connected to the end 14 of coil 13, thereby energizing the relay coil and closing switches 17 and 18 and continuing the power flow to output terminal 9 and output lead 11. At the same time, the other side of the power circuit is completed from terminal 7 via conductor 24 to and through switch 18 and lead 12 to output terminal 10. If by chance the polarity of the incoming voltage is reversed, the power supply circuit will not be completed due to the normally open relay switches 18. In such case, the potential side of the power will be applied at input terminal 7 and find an open relay switch 18; and the ground side of the circuit will be applied at terminal 6 which is incapable of energizing relay coil 13. Thus relay switches 17 and 18 will remain open and the circuit unenergized even though the manual power switch 22 is closed. Where such a reverse polarity condition exists (external of section 4) there is thus no possibility of danger to personnel or equipment due to charging up of the equipment chassis or shorting of the applied voltage. Where polarity is reversed, it is possible to establish proper operating conditions by inverting the plug of the powerline leading to terminals 6 and 7. However, where a three prong plug is used, the inverting of the plug is not feasible. Accordingly, we provide in section 4 a polarity reversing switch 26 which may be thrown so as to establish proper operating polarity in the circuit. As shown here, a double-pole double-throw switch is connected to input conductors 21 and 24 and to a pair of output conductors 27 and 28 which are connected to manual switch 22 and relay switch 18 respectively. Normally when input terminals 6 and 7 represent the potential and ground sides of the incoming power, switch 26 will be thrown upwardly, as indicated in the drawing, so that conductors 27 and 28 will represent the potential and ground sides of the power circuit. On such occasions when the polarity of the incoming power is reversed so that terminals 6 and 7 represent the ground and potential sides of the power, switch 26 will be thrown downwardly, as indicated in the drawings, so as to make conductors 27 and 28 the potential and ground sides of the power.

Preferably a "power-on" indicator 31 is connected between output leads 11 and 12 so as to show that power is on and is being applied at the output terminal. This indicator may be a conventional neon lamp or the like.

While the polarity control circuit of section 4 may be used with various electrical apparatus having power potential and ground input terminals, it is particularly effective when used in conjunction with the DC rectifying, filtering, and voltage multiplication section 5, as illustrated in the drawing, and which is adapted for operating directly off from the AC supply line without the use of the conventional power transformer, relying for its safe operation upon the operation of section 4 above described.

Section 5 consists briefly of a plurality of series connected half-wave rectifiers, diodes 36, 37, 38, and 39 which are connected between a high-voltage output line 41 and ground terminal 42; a capacitor 43, connected by conductor 44 to power supply lead 11 and by conductor 46 to the junction 47 between diodes 36 and 37; a capacitor, here represented by series connected capacitors 48 and 49, connected by conductor 51 to power supply lead 11, and by conductor 52 to the junction 53 between diodes 38 and 29; an intermediate voltage output line 54 connected to the junction 56 between the diodes 37 and 38; a capacitor 57 connected between output lines 41 and 54; a capacitor 58 connected between output line 54 and ground 42; and a plurality of resistors 61, 62, 63, 64, and 65, one each being connected in parallel across each of the capacitors 43, 48, 49, 57, and 58.

The present power supply relies in part upon the use of the very large computer grade capacitors now obtainable in order to obtain a relatively high-power output of well filtered DC; and the use of a series of diodes stacked in a voltage multiplication manner to provide a plurality of voltage outputs without requiring either a power transformer, a resistor voltage divider, or voltage dropping resistors. The combination of the large capacitors and the parallel connected resistors also affords excellent voltage regulation heretofore obtainable only with the use of relatively large and expensive power transformers and other components. In the present case the power supply transformer is part of the utility distribution system and not part of the present apparatus.

Since the several voltage drops occur in the series connected diodes, another intermediate voltage output line 67 may be connected to junction 53 so that progressively increasing voltages may be taken from lines 54, 52, and 41. Of importance also in the circuitry is the fact that the incoming supply voltage from line 11 is fed in parallel to junctions 47 and 53 so that no power reduction is caused by the series voltage adding arrangement of the diodes. It will further be noted that because of the series voltage adding arrangement of the circuit, each individual segment operates at relatively low voltage, thus enabling the use of available low-voltage, large capacitance, computer grade capacitors. For example, for an output in the order of 650 volts, only capacitors 48 and 49 need be placed in series for voltage protection. In the arrangement shown each of the segments adds approximately 150 volts peak with a somewhat smaller operating voltage being realized by reason of the voltage equalization, capacitor bleeding, resistors 61–65. Also because of the relatively low voltage at each stage, lower wattage resistors can be used than normally employed. The present power supply can be readily designed, with additional stages, to provide up to 1,000 volts of well filtered DC at up to 600 mills and with 5 percent regulation.

Because of the large aggregate capacitance represented in section 5, it is desirable to initiate current flow into the system prior to the closing of the relay switches 17 and 18 so as to minimize the surge effect. For this purpose a resistor 71 is mounted across switch 17 and functions to provide a charging current to capacitors 43, 48 49, 57, and 58 during the period of closing of the relay switches, a period of a few milliseconds. This allows the zero impedance of the high-voltage power supply capacitor bank to be raised during the closing of the relay switches so as to reduce the inrushing current when the switches are closed. A "slow-blow" fuse 72 is preferably included in conductor 21.

In the circuit here illustrated, a separate biasing voltage section is provided and includes a rectifier, diode 76, connected in reverse polarity to provide a negative potential and which is connected by conductor 77 to output line 11 and in series with resistors 78, 79 and 80 with ground connection 82. A variable tap 83 is taken off from resistor 79 to provide desired bias voltage; and a switch 84 across resistor 78 may be opened and closed to change the range of voltage obtained. A filter capacitor 85 is connected in parallel across the series combination resistors 78, 79 and 80. Also a filament transformer 86 is connected to the voltage supply line 11 and to ground to supply required filament voltages.

We claim:

1. An alternating current electric power supply apparatus comprising:
   first, second and third power input terminals for connection to the potential, neutral and ground leads respectively of a three-wire alternating current electric power supply;
   first and second power output terminals;
   a relay having first and second normally open switches and a winding functioning when energized to close said switches;
   first and second ends of said winding being connected to said first and third input terminals respectively;
   said first switch being connected between said first winding end and said first output terminal; and
   said second switch being connected between said second input terminal and said second output terminal.

2. An electric power supply apparatus as defined in claim 1, and a manually controlled double-pole, double-throw switch mounted in and connected for reversing the connections between said first and second input terminals and said first and second relay switches.

3. An electric power supply apparatus as defined in claim 2, and a power-on indicator connected between said output terminals.

4. An electric power supply apparatus as defined in claim 1;
   a rectifier and capacitor connected to said output terminals and providing a DC voltage output; and
   a resistor connected in parallel across said first relay switch and providing a charging current to said capacitor during the closing time of said last named relay switch.

* * * * *